(12) United States Patent
Soane et al.

(10) Patent No.: US 6,268,458 B1
(45) Date of Patent: Jul. 31, 2001

(54) COUPLER FLUIDS FOR PROJECTION TELEVISIONS

(75) Inventors: David S. Soane; Zoya M. Soane, both of Piedmont, CA (US)

(73) Assignee: Corning Precision Lens, Cincinnati, OH (US)

( * ) Notice: Subject to any disclaimer, the term of this patent is extended or adjusted under 35 U.S.C. 154(b) by 0 days.

(21) Appl. No.: 09/341,022

(22) PCT Filed: Jan. 6, 1998

(86) PCT No.: PCT/US98/00063

§ 371 Date: Sep. 3, 1999

§ 102(e) Date: Sep. 3, 1999

(87) PCT Pub. No.: WO98/31134

PCT Pub. Date: Jul. 16, 1998

Related U.S. Application Data

(60) Provisional application No. 60/035,771, filed on Jan. 7, 1997.

(51) Int. Cl.$^7$ .................................................. C08G 77/14
(52) U.S. Cl. ................................ 528/43; 528/29; 528/31; 252/582; 252/585; 359/665; 359/649; 348/844
(58) Field of Search ................................ 528/43, 29, 31; 348/844; 252/582, 585; 359/649, 665

(56) References Cited

U.S. PATENT DOCUMENTS

| | | |
|---|---|---|
| 3,933,678 | * 1/1976 | Graham ................................ 252/300 |
| 4,151,554 | 4/1979 | Tucker . |
| 4,163,990 | 8/1979 | Hodges . |
| 4,420,409 | 12/1983 | Fukano et al. . |
| 4,511,927 | 4/1985 | Bauer . |
| 4,620,773 | 11/1986 | Fukuda . |
| 4,646,143 | 2/1987 | Watanabe et al. . |
| 4,701,272 | * 10/1987 | Mori et al. ............................ 252/28 |
| 4,710,820 | 12/1987 | Roberts . |
| 4,764,806 | 8/1988 | Altman . |
| 5,541,776 | * 7/1996 | Kobayashi et al. .................. 359/665 |
| 5,585,867 | 12/1996 | Ooya . |
| 5,665,275 | * 9/1997 | Kobayasahi et al. ................ 252/582 |
| 5,692,088 | * 11/1997 | Ishiharada et al. .................. 385/125 |
| 5,783,115 | * 7/1998 | Bilkadi et al. ....................... 252/582 |

* cited by examiner

Primary Examiner—Margaret G. Moore
(74) Attorney, Agent, or Firm—Maurice M. Klee; Alfred L. Michaelsen

(57) ABSTRACT

Coupling fluids for use in optically coupling a projection lens system of a projection television to a cathode ray tube (CRT (16)) are provided. The fluids have: (1) at least one polymer having a siloxane backbone, i.e., at least one polymer having a —Si—O—Si—O—Si— backbone, and (2) methyl, phenyl, and hydrophilic groups attached to the silicon atoms of the backbone. The fluid can be composed of a single siloxane polymer having methyl, phenyl, and hydrophilic side groups or a mixture of a siloxane polymer having methyl and phenyl side groups with a siloxane polymer having methyl and hydrophylic side groups. The index of refraction of the fluid is preferably greater than 1.52 so as to minimize reflections at the interface between the fluid and the faceplate (17) of the CRT (16).

42 Claims, 1 Drawing Sheet

COUPLER FLUIDS FOR PROJECTION TELEVISIONS

CROSS REFERENCE TO RELATED APPLICATIONS

This application is the U.S. national phase of International Application No. PCT/US98/00063, filed Jan. 6, 1998, and claims the benefit under 35 USC §119(e) of U.S. Provisional Application No. 60/035,771, filed Jan. 7, 1997, the contents of both of which in their entireties are hereby incorporated by reference.

FIELD OF THE INVENTION

This invention relates to projection televisions and, in particular, to coupler fluids for use in optically coupling a projection lens system of such a television to a cathode ray tube (CRT).

BACKGROUND OF THE INVENTION

Projection televisions are widely used in both the consumer (home entertainment) and commercial (presentation) markets. Instead of employing direct viewing of an image formed by electron beam impingement on the phosphors of a cathode ray tube, such televisions use a projection lens system to form an enlarged image of the face of one or more CRT tubes on a viewing screen.

For color systems, one three-color CRT and one projection lens system can be used or, more commonly, three CRTs and three projection lens systems are used, with each CRT/projection lens system combination producing an individual color image, e.g., red, green, and blue images, which are superimposed at the viewing screen to form a full color image. The projection television can be of the front or rear projection type depending on whether the viewer and the CRT/projection lens system(s) are on the same or opposite sides of the viewing screen.

A typical projection lens system contains at least three lens elements, at least some of which are typically composed of plastic materials, such as, acrylic or polyolefin. Plastic lens elements are desired both from a weight and cost perspective, especially when a particular lens element needs to have an aspherical surface to provide aberration correction. The projection lens system can be either air coupled or liquid coupled to the faceplate of the CRT. As the names imply, in an air coupled system, the interface between the CRT and the lens system, or more particularly, the last lens element of the lens system, is air, while in a liquid coupled system, it is a coupling fluid (coupling liquid).

The present invention is concerned with liquid coupled systems and, in particular, with providing improved coupling fluids for use in such systems. The requirements for an ideal coupling fluid are numerous. Among other things, the fluid should minimize reflection loss at the interface between the fluid and the CRT, should cool the CRT, and should generally improve the veiling glare of the system.

To date, ethylene glycol, mixtures of ethylene glycol and glycerol, and mixtures of ethylene glycol and water have been employed extensively as coupling fluids in projection TVs. The preferred fluid in recent years has been ethylene glycol/glycerol mixtures due to the relatively low volatility of the constituent components. As a result, the loss of coupling fluid through the last lens element of the projection lens system has been minimized. Also, the refractive index of an ethylene glycol/glycerol mixture is higher than pure ethylene glycol or a mixture of ethylene glycol and water. In addition, ethylene glycol/glycerol mixtures exhibit reasonable environmental friendliness, the ability to operate near 90° C., low cost, good compatibility with molded optics, good thermal conductivity, and good optical clarity.

A preferred composition for coupling fluids of this type has been 80% ethylene glycol and 20% glycerol. Further addition of glycerol would cause the projected image to squirm, due to natural convection associated with thermal gradients in a viscous fluid.

Mixtures of ethylene glycol/glycerol, however, do have some properties which limit their usefulness. For example, the inherent electrical conductivity of this mixture is a problem. If an accidental spill occurs and the fluid gets onto a printed circuit board, the board has to be discarded to avoid electrical malfunction and even possible fire caused by the relatively high electrical conductivity of the fluid. Even more basically from an optics point of view, the refractive index of the mixture is lower than desired. Accordingly, couplers employing this mixture still suffer from relatively high levels of reflection at the CRT/coupler fluid interface. These reflections, in turn, lower the overall contrast of the projected image, making projection televisions less acceptable to some users in comparison to direct view televisions.

DESCRIPTION OF THE PRIOR ART

Discussions of liquid coupled projection televisions can be found in a variety of issued U.S. patents, including: Tucker, U.S. Pat. No. 4,151,554; Hodges, U.S. Pat. No. 4,163,990; Bauer, U.S. Pat. No. 4,511,927; Fukuda, U.S. Pat. No. 4,620,773; Watanabe et al., U.S. Pat. No. 4,646,143; Roberts, U.S. Pat. No. 4,710,820; and Altman, U.S. Pat. No. 4,764,806.

SUMMARY OF THE INVENTION

In view of the foregoing, it is an object of this invention to provide coupling fluids for projection televisions that possess some and preferably all of the following properties:

(1) The fluid is optically clear.
(2) The fluid will remain optically clear through repeated temperature cycles in the presence of the ambient moisture of room air.
(3) The fluid has a high refractive index, preferably in the range of 1.52 to 1.53, to match the index of refraction of the glasses used to form the faceplates of CRTs.
(4) The fluid is compatible with molded thermoplastic lens elements so that an element can endure multiple temperature cycles in the presence of the fluid without substantial loss of its optical properties.
(5) The fluid is compatible with lens housing materials, such as, glass-filled polycarbonate, glass-filled nylon, polyphenylene sulfide, and other filled or unfilled high performance engineering thermoplastics.
(6) The fluid is environmentally friendly, e.g., it exhibits low volatility, low odor, and low toxicity.
(7) The fluid has a moderate viscosity, e.g., a viscosity of less than about 10,000 centipoise at room temperature.
(8) The fluid has adequate thermal conductivity to help dissipate heat generated by the CRT.
(9) The fluid has a relatively low electrical conductivity and, preferably, is a non-conductor.

To achieve these properties, the invention provides a coupling fluid which either comprises a siloxane polymer having methyl, phenyl, and hydrophilic side groups or comprises a mixture of a siloxane polymer having methyl and phenyl side groups with a siloxane polymer having methyl and hydrophilic side groups. As used herein, a side group can also be a terminal group when the group occurs at the end of a polymer chain. Siloxane polymers having such organic pendant groups attached to their silicon atoms as side groups are also known as "silicones".

The fundamental aspects of the invention are thus: (1) at least one polymer having a siloxane backbone, i.e., at least one polymer having a —Si—O—Si—O—Si— backbone, and (2) methyl, phenyl, and hydrophilic groups attached to the silicon atoms of the backbone.

Moderate viscosity and low volatility are achieved by adjusting the degree of polymerization (or chain length) of the component or components of the coupling fluid, including the degree of polymerization of the hydrophilic side groups when polymeric materials, such as polyethylene glycol, are used for such groups (see below). Typically, average molecular weights above several hundred daltons offer both desirable viscosity/volatility combinations and chemical inertness so that the coupling fluid does not attack the lens materials by, for example, causing them to craze.

A high index of refraction is obtained by aromatic substitution of side groups, thus phenyl-substituted siloxanes. Generally, phenylmethyl siloxanes form a key ingredient or starting material for the formulation or downstream chemical modification to derive the final fluid.

Moisture compatibility is afforded by hydrophilic substitution as side/terminal groups. In particular, selected locations are modified by the introduction of polar groups. This must be done with care, however, as too much substitution deteriorates compatibility with the plastic lenses. Also, the level of hydrophilic substitution must be chosen so that the amount of water absorbed by the coupling fluid at elevated temperatures is not so high as to result in the creation of haze in the fluid when the fluid is cooled to room temperature. Use of less than 20 percent by weight of hydrophilic side groups in the coupling fluid will generally avoid this hazing problem. Preferably, the weight percent of hydrophilic side groups is less than 5% and most preferably less than 1%.

A preferred choice for the hydrophilic groups is polyethylene glycol. Accordingly, a preferred formulation of the coupling fluid is a siloxane backbone having phenyl, methyl, and polyethylene glycol side groups. In another preferred embodiment, the final fluid is formed by mixing polyphenylmethylsiloxane with copolymers of polymethylsiloxane-polyethylene glycol. Alternatively, the copolymer mixed with the polyphenylmethylsiloxane can be a polymethylsiloxane-polypropylene glycol or a polymethylsiloxane-polyethylene propylene glycol copolymer.

The degree of polyethylene glycol substitution in the overall fluid is generally within 20%, or preferably within 5% or more preferably within 1% of the total system weight. When reasonable isolation of the coupling fluid from the ambient air can be ensured, zero or near zero substitution of hydrophilic groups can be considered so as to reduce the complexity of the coupling fluid.

In addition to the above, hydrophilic side groups can be chosen from a range of commonly known water-soluble or water-absorbing polymers, such as polyvinyl alcohol, polyvinyl acetate, polyhydroxyethylacrylate (HEA), polyhydroxyethylmethacrylate (HEMA), polysaccharides, aminoalkyl groups, amino-aryl groups, carboxylate-terminated alkyl groups, carboxylate-terminated aryl groups, and the like. These substitutions can replace the role of polyethylene glycol, polypropylene glycol, or polyethylene propylene glycol.

Figure 1:
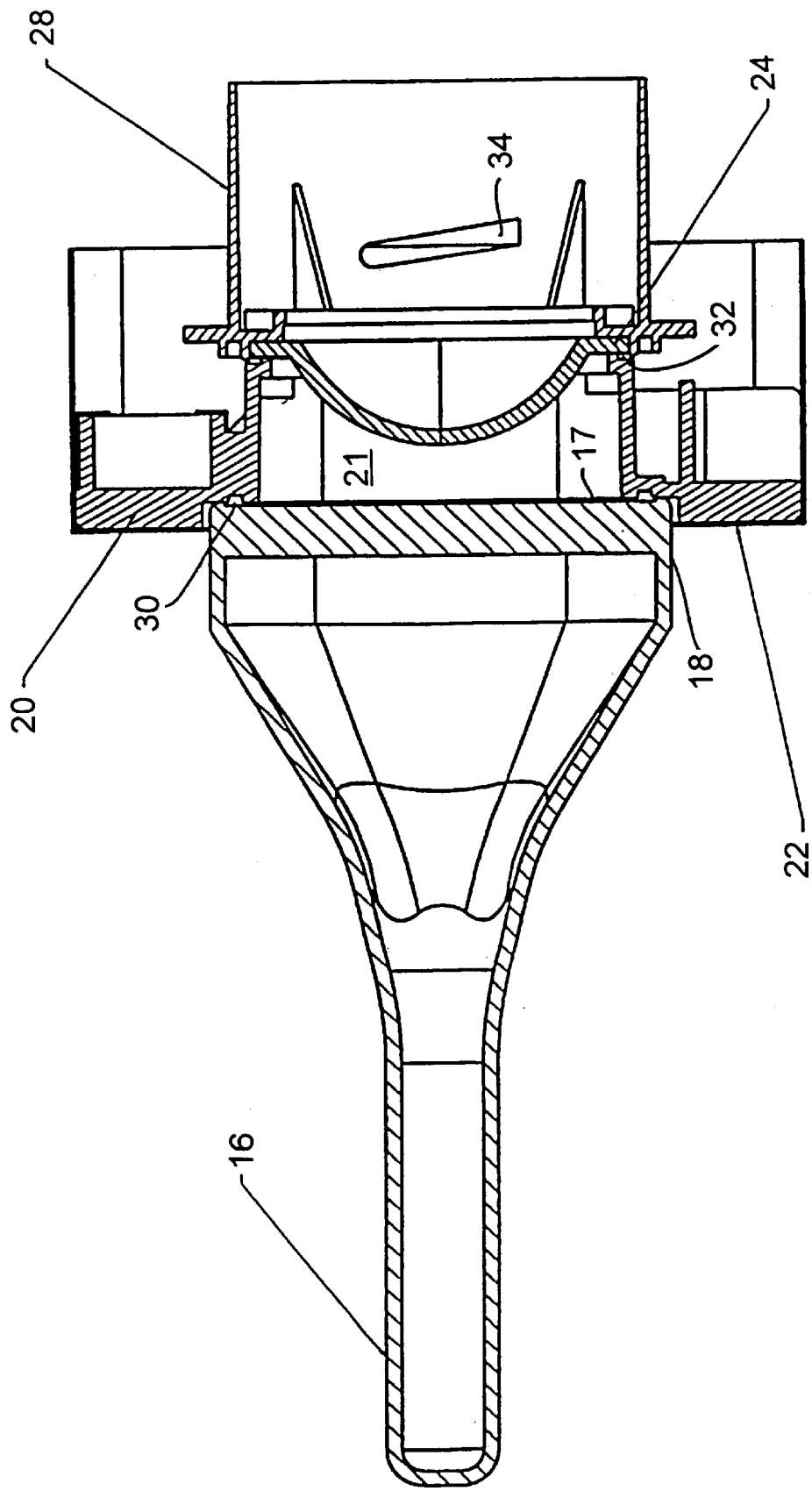
FIG. 1 is a cross-sectional view of a coupler system with which the coupler fluids of the present invention may be used.

The foregoing drawing, which is incorporated in and constitutes part of the specification, illustrates the manner of use of the coupler fluids of the invention, and together with the description, serves to explain the principles of the invention. It is to be understood, of course, that both the drawing and the description are explanatory only and are not restrictive of the invention.

DESCRIPTION OF THE PREFERRED EMBODIMENTS

As discussed above, the coupling fluid of the invention can comprise a siloxane polymer having methyl, phenyl, and hydrophilic side groups (hereinafter referred to as the "single polymer embodiments" of the invention). The polymer of these embodiments preferably has a degree of polymerization between 10 and 1,000, more preferably between 50 and 500, and most preferably between 100 and 200. A degree of polymerization below 10 will generally result in a clouded (crazed) lens for many lens materials, especially if the operating temperature of the projection lens system is particularly high; a degree of polymerization greater than 1,000 generally results in a finished fluid which has an excessively high viscosity. These degree of polymerization values represent the combined degree of polymerization of the siloxane backbone and of the hydrophilic side groups when those groups are themselves polymers. The ratio of the polymer's methyl side groups to its phenyl side groups is preferably between 3:1 and 1:3.

As also discussed above, the coupling fluid can comprise a mixture of a siloxane polymer having methyl and phenyl side groups and a siloxane polymer having methyl and hydrophilic side groups (hereinafter referred to as the "mixture of polymers embodiments" of the invention). The siloxane polymer having methyl and phenyl side groups is a hydrophobic oil which becomes cloudy when in contact with water. It preferably has a degree of polymerization between 10 and 1,000, more preferably between 50 and 500, and most preferably between 100 and 200. Again, a degree of polymerization below 10 generally results in clouded lenses and a degree of polymerization greater than 1,000 generally results in an unacceptably high viscosity for the coupling fluid. The ratio of methyl side groups to phenyl side groups for this polymer is preferably between 3:1 and 1:3. The methyl side groups ensure that this polymer is a liquid at room temperature so that it can be mixed with the siloxane polymer having methyl and hydrophilic side groups.

The siloxane polymer having methyl and hydrophilic side groups preferably has a degree of polymerization between 10 and 1,000, more preferably between 10 and 500, and most preferably between 10 and 100. Again, these degree of polymerization values represent the combined degree of polymerization of the siloxane backbone and of the hydrophilic side groups when those groups are themselves polymers. The ratio of the weight of the hydrophilic side groups to the weight of the siloxane polymer backbone plus methyl side groups for this polymer is preferably between 1:9 and 9:1. Methyl groups are included in this polymer so as to provide compatibility with the siloxane polymer having methyl and phenyl side groups.

The polymer having methyl and hydrophilic side groups is preferably formed by reacting a siloxane polymer having methyl side groups with a hydrophilic reactant. The hydrophilic reactant is preferably a polymer in which case the polymer having methyl and hydrophilic side groups is a diblock copolymer. The siloxane polymer having methyl side groups preferably comprises at least 15 percent by weight of the diblock copolymer so as to achieve phase compatibility with the siloxane polymer having methyl and phenyl side groups. Although levels up to 30 weight percent of the siloxane polymer having methyl side groups can be used, the lowest possible levels are preferred so that the index-raising effects of the phenyl side groups are not diluted. Also, at levels above 20 weight percent, the diblock copolymer can attack the plastic lenses for some resin materials, e.g., polymethylmethacrylate (PMMA), modified PMMA, e.g., imidized PMMA, and polycarbonates.

Whether formed as a single polymer or as a mixture of polymers, the hydrophilic side groups preferably comprise between 0.05 wt. % and 20 wt. % of the coupling fluid, more preferably between 0.05 wt. % and 2 wt. %, and most preferably between 0.05 wt. % and 1 wt. %.

In many cases, the mixture of polymers embodiments of the invention can be prepared using commercially available components. For example, polyphenylmethylsiloxanes of a range of compositions are commercially available from General Electric (Schenectady, N.Y.), Dow Corning (Midland, Mich.), and United Chemical Technologies (Bristol, Pa.). Similarly, polyethylene glycol and polypropylene glycol terminated dimethylsiloxane polymers are commercially available from United Chemical Technologies (UCT) and Genesee Polymers (Midland, Mich.). Examples of suitable materials for use in the practice of the invention are as follows: Dow Corning 710 Fluid, UCT PS 071, and UCT PS 073.5.

The coupling fluid can also include a thermal stabilizer, such as butylated hydroxytoluene (BHT) or diphenylpicrylhydrazyl (DPPH). Such a stabilizer helps prevent breakdown of the coupling fluid, in particular, the hydrophilic component of the fluid, at high temperatures.

The finished coupling fluid preferably has an index of refraction greater than 1.50 at room temperature and more preferably greater than 1.52. For some applications, a coupling fluid having an index of refraction greater than 1.53 at room temperature is most preferred. The index of refraction of the coupling fluid decreases as the fluid is heated and thus the room temperature index of refraction must be higher than the desired index of refraction at the fluid's operating temperature. The viscosity of the coupling fluid at room temperature is preferably less than 10,000 centipoise.

Experimentally, coupling fluids following the above teachings are prepared and tested as follows. First, the fluids are prepared. Then, sample lenses, composed of, for example, polymethylmethacrylate, imidized polymethylmethacrylate, polycarbonate, and polycycloolefin, are immersed in the fluids and temperature cycled and thermally soaked at elevated temperatures for long durations. The optical transparency of both the fluids and the lenses are then examined with, for example, a UV-visible spectrometer. The surface of the lenses must remain hard and unaffected by the fluids. That is, they should not soften, haze, or craze.

The following examples illustrate the preparation of various silicone-based coupling fluids. The examples are not meant to be exhaustive. Other parallel approaches are considered to fall within the spirit and scope of this invention, where the use of aromatic, aliphatic, and polar side groups on silicones of a reasonable molecular weight range forms the basic foundation for meeting the above-listed property requirements.

EXAMPLE 1

Synthesis of Polyethylene Oxide Substituted Phenylmethylsiloxane

Hydroxy-terminated polyethylene oxide (PEO) of desired molecular weight and molecular weight distribution (e.g., average molecular weight of 400 with a polydispersity index of 3) is mixed with polyphenylmethyl-siloxane (PPMS) with end termination or side groups of SiH bonds, e.g., Dow Corning 710. The mixture is heated at atmospheric pressure in THF (tetrahydrofuran) at 60° C. for 24 hours. The mixture comprises, for example, 20 parts PEO, 10 parts PPMS, and 70 parts THF; 500 ppm of zinc octonate is added as a catalyst.

The result is a PEO-substituted phenylmethylsiloxane. The degree and location of substitution are determined by the SiH bonds in the starting material. PEO substituted phenylmethylsiloxane exhibits a high refractive index (>1.50), optical transparency, chemical inertness, and a controlled hydrophilicity that allows the material to tolerate a slight amount of moisture without phase separation.

EXAMPLE 2

Synthesis of polyethylene oxide terminated phenylmethylsiloxane The starting materials are allyl terminated polyethylene oxide of moderate molecular weights, e.g., molecular weights of about 500, and polyphenylmethylsiloxanes with ending SiH groups, e.g., Dow Corning 710. In the presence of a platinum catalyst the two ingredients react to form PEO substituted siloxane, with a $CH_2CH_2CH_2$ intervening bridge. This arrangement imparts added hydrolytic stability. The resulting fluid is a high refractive index material (>1.52), which is optically clear and exhibits significant chemical inertness.

Synthesis of a-allyl co-methyl polyethylene glycol (PEG) is accomplished by the reaction of PEG with allylbromide (2×excess) after PEG is converted into its sodium salt by means of reaction with sodium in anhydrous tetrahydrofuran (THF). The second step is then hydrosilylation carried out in anhydrous toluene. The catalyst is H2PtClG (a platinum compound). This hydrosilylation reaction is accomplished over 48 hours at 90° C. to 100° C. at atmospheric pressure with precursor mixtures of slightly higher than stoichiometry of allyl PEG over SiH terminated polyphenylmethylsiloxane, e.g., 10% higher. An alternative catalyst and solvent system for hydrosilylation is platinum-divinyltetramethyldisiloxane complex in xylene. The polyphenylmethylsiloxane starting material can be prepared by reacting polymethylhydrosiloxane with vinyl chlorobenzene in toluene at 80° C. for 48 hours.

EXAMPLE 3

Mixtures of Polyethylene Oxide-co-dimethylsiloxane Polymer and Polyphenylmethylsiloxane.

Optically clear, hydrolytically stable, and chemically inert fluids of varying refractive indices can be formulated by blending two or more ingredients of selected molecular weights and compositions. The starting components include PEO terminated polydimethylsiloxane (molecular weight of approximately 500) and phenymethylsiloxane polymer (molecular weight of approximately 3,000). Instead of a phenymethylsiloxane polymer, phenyl substituted dimethylsiloxane can be used. The phenyl containing siloxanes can have a range of degree of phenyl substitution (e.g., from 75% to 25%) giving rise to ingredients of wide ranging refractive indices (e.g., from 1.58 to 1.50) and viscosities (e.g., from about 10,000 centipoise to about 2,000 centipoise). (The viscosity increases with degree of substitution for a given chain length).

The compatibility of the phenyl-substituted and PEO terminated siloxanes is sufficient to permit molecular level intermixing, yielding optically transparent fluids of controlled degrees of hydrophilicity/hydrophobicity and precisely tailored refractive indices. Since the molecular weight distributions of the components are broad, the components are characterized by their room temperature viscosities. The PEO siloxane copolymer is available between 25 and 45 cP from United Chemical Technologies (product designations PS 071 and PS 073.5). Genesee Polymers also offers a PEO siloxane copolymer under the designation GP 217. The phenylmethylsiloxanes are available in viscosities of several hundred cPs, e.g., 450 to 550 cP, as GE's SF1154 or SF1265 fluid and Dow Corning's 710 fluid. The two components are entirely miscible when given adequate mechanical agitation and stirring, forming a single phase system.

Compositions between 0% to 10% by volume of PEO siloxane are especially useful as coupling fluids. Engineering thermoplastics such as polymethylmethacrylate, polycarbonate, imide-substituted polymethylmethacrylate, polycycloolefins are found to remain unattacked by such fluid mixtures even at elevated temperatures, e.g., as high as 80 to 90° C. (for extended durations).

EXAMPLE 4

Mixtures of Polyethylene-propylene Oxide-co-dimethylsiloxane Polymer and Poly-phenylmethylsiloxane As in Example 3, optically clear, hydrolytically stable and chemically inert fluids of controlled refractive indices are obtained by blending polyphenylmethylsiloxane with a block copolymer consisting of a dimethylsiloxane block and either a pure propylene oxide (PPO) block or a mixed ethylene/propylene (EO—PO) block, e.g., GE's SF1188 material or UCT's PS 072 material. The block copolymer can be anywhere around 100 cP or above in viscosity at room temperature, indicating relatively larger molecular weights than the PEO terminated polydimethylsiloxane in Example 3. However, the slightly less polar nature of PPO or EO—PO allows compatible mixtures to form with higher component molecular weights. A suitable blend is, for example, 99% Dow Corning 710 and 1% or less of the block copolymer.

The benefits of these blends compared with those of Example 3 are even greater chemical inertness at elevated temperatures (~90° C.), when the lens plastics are exposed to such fluid mixtures for extended durations (e.g., 10,000 hours). No sign of surface attack is observed after plastic-fluid contact simulating projection TV use conditions.

EXAMPLE 5

Thermally Stabilized Coupling Fluids

In order to ensure high temperature stability, mixtures of polyphenylmethylsiloxane and polymethylsiloxane-co-polyethylene glycol are further modified by a soluble thermal stabilizer. A typical formulation includes 99% by weight polyphenylmethylsiloxane, e.g., Dow Corning 710, and 0.1 to 1% by weight polymethylsiloxane-co-polyethylene glycol, e.g., UCT PS 071 or PS 073.5. In addition 0.01 to 0.1% by weight of butylated hydroxytoluene (BHT) or diphenylpicrylhydrazyl (DPPH) can be added for thermal stabilization.

EXAMPLE 6

Refractive Index Measurements on Silicone Fluids with Varying Degrees of Methyl and Phenyl Substitutions.

In order to develop suitable coupling fluids with a refractive index matching that of the glass plate of the CRT, a series of silicones with different degrees of phenyl and methyl substitutions are studied. They range in composition from 75 mole percent to 5 mole percent in phenyl substitution (the balance being methyl). The refractive index at room temperature ranges from 1.582 to 1.422. Listed in descending order, the refractive indexes are 1.582, 1.533, 1.500, 1.488, 1.425 and 1.422, corresponding to 75 mole percent, 50 mole percent, 25 mole percent, 20 mole percent, 10 mole percent, and 5 mole percent phenyl substitution. Blends of polymethylphenylsiloxanes of different degrees of substitution yield fluids with refractive indexes approximated by linear mixing rules. It is the overall composition of the phenyl vs. methyl content that governs the refractive index of the final mixture.

EXAMPLE 7

Coupler Fluid Testing

This example illustrates the testing of coupler fluids prepared in accordance with the invention.

Seven coupling fluids were tested which will be identified below by the letters A, B, C, D, E, E', and G. Each of these fluids was made by mixing together a siloxane polymer having methyl and phenyl side groups and a siloxane polymer having methyl and hydrophilic side groups.

The siloxane polymer having methyl and phenyl side groups was Dow Corning 710 and the siloxane polymer having methyl and hydrophilic sidegroups was UCT PS 071 or PS 073.5, which were found to be functionally equivalent. The compositions of the seven coupling fluids were as follows:

Coupling fluid A: 80% Dow Corning, 20% UCT;
Coupling fluid B: 85% Dow Corning, 15% UCT;
Coupling fluid C: 90% Dow Corning, 10% UCT;
Coupling fluid D: 95% Dow Corning, 5% UCT;
Coupling fluid E: 97.5% Dow Corning, 2.5% UCT;
Coupling fluid E': 99% Dow Corning, 1% UCT; and
Coupling fluid G: 99.9% Dow Corning, 0.1%UCT.

A thermal stabilizer, namely BHT, was added to fluid E in some cases (referred to herein as "fluid E (stab)"). When used, the BHT concentration was in the range of 100 ppm to 500 ppm. BHT was also used in fluid G, in this case at a concentration of 250 ppm.

The compatibility of these fluids with the resin materials used for plastic projection lenses was tested by submersing small cross-sections of PMMA, imidized PMMA, polycarbonate, and amorphous polyolefin in the fluids. In this preliminary test, fluid E appeared the easiest on the lens materials and fluid B seemed the harshest.

Further tests were conducted using entire lens elements instead of small cross-sections. These tests showed that the fluids did not attack the lenses in that the decrease in transmission was less than 0.5% and the increase in haze was similarly less than 0.5%.

Small cross-sections of amorphous polyolefin which had been dyed blue, green, and red were submersed in fluid E and heated to 90° C. in a vacuum oven. After 1500 hours at this elevated temperature, there was no apparent change in the color of the samples or of the fluid. Testing using a colorimeter was not performed due to the small size of the samples. The fluid was found to develop a haze when taken out of the vacuum oven at 90° C. and cooled in ambient conditions. Haze was also observed when fluid E was heated to 80° C. for approximately 7 days and then cooled.

The thermal expansion of fluid E was measured by adding 130 ml of this fluid to a graduated cylinder and heating the fluid to 90° C. The volume increased to 136 ml, a 4.6% change. For comparison, the volume expansion coefficient of ethylene glycol is $6.5 \times 10^{-4}$. A 100 ml sample of fluid E will thus expand only about 0.6 ml more than ethylene glycol.

The refractive index of fluid E (stab) was measured as a function of temperature using an Abbe refractometer equipped with a water bath (temperature accuracy =±0.2° C.; index of refraction accuracy =±0.0002). Measurements were taken at approximately 3° C. intervals at 589 nm over the range from 20° C. to 50° C. The temperature of the refractometer was considered stable when there was a constant temperature for approximately two minutes. Fitting of a linear trendline to the data gave the following equation:

$$RI = -0.00042 \, T + 1.5449$$

where RI is the refractive index of the fluid and T is temperature. The $R^2$ value for this fit was 0.99907.

A thin layer of coupling fluid E was found to haze when heated to 90° C. at 50% relative humidity for approximately 24 hours and then cooled to room temperature under the same level of relative humidity. This is considered to be an extreme test since the same relatively humidity was used at the elevated temperature and at room temperature. In practice, the relative humidity will drop as the temperature increases. Coupling fluid A, when subjected to the same conditions, did not haze. The experiment with coupling fluid E was repeated with the heating conducted for approximately 24 hours under a vacuum of 28" of mercury. No hazing was found under these conditions. A sample of hazed fluid was also subjected to the vacuum cycle. The hazing was reduced, but not eliminated.

In another test, 14 liters of coupling fluid E were heated to 80° C. in a glass container sealed with a polycarbonate lid and a Viton seal. The container had a capacity of 17 liters and the portion of the container which id not contain the coupling fluid was filled with air. The fluid exhibited haze when cooled to room temperature. Similarly, coupling fluid E exhibited haze when heated to 90° C. in a vacuum oven without vacuum for 1500 hours and then removed from the oven and allowed to cool to room temperature. In a related experiment, a thin layer of coupling fluid E (stab) was heated to 90° C. in a vacuum oven without vacuum for approximately 24 hours and then cooled in the vacuum oven. No hazing was observed under these conditions. The thin layer of coupling fluid E (stab) was prepared by adding 2 drops of the BHT stabilizer to approximately 30–40 ml of fluid E. The sample was then poured into a 2,000 ml beaker to create a thin film.

Fluid E (stab) was introduced into a coated aluminum coupler which coupled a glass faceplate to an imidized PMMA lens using Viton seals. The coupler was subjected to 94 cycles of 1.5 hours at 80° C. and 6% relative humidity followed by 0.5 hours at 22° C. and 40% relative humidity. The fluid exhibited haze under these conditions. The experiment was repeated using coupler fluid E'. This fluid survived 168 cycles with no haze. (The cool soak was increased to 1 hour after 84 cycles in this experiment.) The experiment was continued to 306 heat/cool cycles with a month at room temperature. Again, no haze was observed.

Fluid E (stab) was introduced into a coated aluminum coupler which coupled a glass faceplate to an amorphous polyolefin lens using Viton seals. The coupler was subjected to 296 cycles of 1.5 hours at 80° C. and 6% relative humidity followed by 0.5 hours at 22° C. and 40% relative humidity. The cool soak was increased to 1 hour after 212 cycles. The fluid exhibited no haze under these conditions. The experiment was continued to 424 heat/cool cycles with a month at room temperature. Again, no haze was observed.

The difference in behavior between the imidized PMMA lens and the amorphous polyolefin lens is believed to be due to the fact that the imidized PMMA resin has a higher water permeability than the polyolefin resin. Also, the imidized PMMA resin is more susceptible to attack by ethylene oxide at high temperatures than the polyolefin resin.

The effects of coupler fluid E were tested on three commercial couplers, namely, a Phillips coupler, a Zenith coupler, and a Sony coupler. In each case, a small amount of the coupling fluid was placed in contact with the surface of the coupler and heated to 90° C. for either 600 hours (Zenith and Sony couplers) or 820 hours (Phillips coupler). Thereafter, the coupler was wiped clean with a paper towel, and the towel was examined for any particulates or discoloration of the coupling fluid, either of which would be evidence of attack of the coupler by the fluid. No particulates or discoloration was observed for any of the couplers. The Zenith coupler had a clear coating, as opposed to a black coating as used with the Sony and Phillips couplers, and thus it is possible, although not considered likely, that some clear particulates were generated which were not observable on the paper towel.

A neoprene sample, an ethylene-propylene (EPDM) sample, a silicone seal, and a Viton O-ring were each submersed in coupling fluid E and heated to 90° C. The fluid discolored after contact with the neoprene (3 days), the EPDM (4 days), and the silicone seal (2 days) at the elevated temperature. It is not known whether this discoloration was due to attack of the neoprene, EPDM, and silicone, or to attack of a mold release agent or other additive contained therein. The coupling fluid in contact with the Viton O-ring did not change color during the elevated temperature test (14 days) or upon further storage at room temperature (>250 days).

Using techniques of the type described above for fluid E (stab), fluid G was tested for its haze properties. It was found that water absorbed by this fluid could be removed by heating to 80° C. and then cooling back to room temperature, thus eliminating haze effects resulting from such water. Fluid G is considered to have at least as good haze and other properties as fluids A, B, C. D, E, E', and E (stab), and is a preferred formulation for the coupling fluid of the invention.

The coupling fluids of the invention can be used with a variety of couplers now known or subsequently developed. A discussion of couplers used with CRT projection televisions can be found in commonly assigned, co-pending, provisional application number 60/013,021, filed Mar. 8, 1996, by John D. Rudolph and entitled "Coupler Systems for Projection Televisions." The relevant portions of that application, including its discussion of conventional metal couplers and its figures illustrating couplers composed of plastic materials, are incorporated herein by reference.

FIG. 1 hereof is a copy of FIG. 4 of the above-referenced co-pending application. The reference numbers used in this figure correspond to the following:

| | |
|---|---|
| 16 | cathode ray tube (CRT) |
| 17 | faceplate of CRT |
| 18 | periphery of faceplate of CRT |
| 20 | first component of coupler |
| 21 | space defined by first component for coupler fluid |
| 22 | second component of coupler |
| 24 | lens element |
| 28 | focus mount for holding lens element 24 in place and for connection to a lens barrel (not shown) which carries other lens elements of a projection lens system |
| 30 | cavity for a sealing gasket |
| 32 | cavity for a sealing gasket |
| 34 | slot in focus mount for varying the axial position of the lens barrel so as to adjust the overall focus of the projection lens system. |

The coupler fluid of the present invention is used in space 21 and thus comes into contact with, and must be compatible with, CRT faceplate 17 composed of glass, first component 20 composed of, for example, plastic or metal, gaskets 30 and 32 composed of resilient rubber-type materials, and lens element 24, typically composed of plastic but which may also be composed of glass.

Although preferred and other embodiments of the invention have been described herein, further embodiments may be perceived by those skilled in the art without departing from the scope of the invention as defined by the following claims.

What is claimed is:

1. A coupling fluid for coupling a projection lens system to a cathode ray tube, said fluid comprising a mixture of:
   (a) a siloxane polymer having methyl and phenyl side groups; and
   (b) a siloxane polymer having methyl and hydrophilic side groups; wherein the fluid has a phenyl side group content sufficient to provide the fluid with an index of refraction equal to or greater than 1.53 at room temperature.

2. A coupling fluid for coupling a projection lens system to a cathode ray tube, said fluid comprising a siloxane polymer having methyl, phenyl, and hydrophilic side groups wherein the fluid has a phenyl side group content sufficient to provide the fluid with an index of refraction equal to or greater than 1.53 at room temperature.

3. A projection television comprising a cathode ray tube and a projection lens wherein the projection lens is liquid coupled to the cathode ray tube by a coupling fluid comprising a mixture of:
   (a) a siloxane polymer having methyl and phenyl side groups; and
   (b) a siloxane polymer having methyl and hydrophilic side groups.

4. The projection television of claim 3 wherein the siloxane polymer having methyl and phenyl side groups has a degree of polymerization between 10 and 1,000.

5. The projection television of claim 3 wherein the siloxane polymer having methyl and phenyl side groups has a degree of polymerization between 50 and 500.

6. The projection television of claim 3 wherein the siloxane polymer having methyl and phenyl side groups has a degree of polymerization between 100 and 200.

7. The projection television of claim 3 wherein the siloxane polymer having methyl and phenyl side groups has a ratio of methyl side groups to phenyl side groups of between 3:1 and 1:3.

8. The projection television of claim 3 wherein the siloxane polymer having methyl and hydrophilic side groups has a degree of polymerization between 10 and 1,000.

9. The projection television of claim 3 wherein the siloxane polymer having methyl and hydrophilic side groups has a degree of polymerization between 10 and 500.

10. The projection television of claim 3 wherein the siloxane polymer having methyl and hydrophilic side groups has a degree of polymerization between 10 and 100.

11. The projection television of claim 3 wherein the ratio of the weight of the hydrophilic side groups to the weight of the siloxane polymer backbone plus methyl side groups for the siloxane polymer having methyl and hydrophilic side groups is between 1:9 and 9:1.

12. The projection television of claim 3 wherein the hydrophilic side groups comprise between 0.05 and 20 percent by weight of the coupling fluid.

13. The projection television of claim 3 wherein the hydrophilic side groups comprise between 0.05 and 2 percent by weight of the coupling fluid.

14. The projection television of claim 3 wherein the hydrophilic side groups comprise between 0.05 and 1 percent by weight of the coupling fluid.

15. The projection television of claim 3 wherein the hydrophilic side groups comprise polyethylene glycol.

16. The projection television of claim 3 wherein the hydrophilic side groups are selected from the group consisting of ethylene glycol, propylene glycol, and polypropylene glycol.

17. The projection television of claim 3 wherein the hydrophilic side groups are selected from the group consisting of polyvinyl alcohol, polyvinyl acetate, polyhydroxyethylacrylate, and polyhydroxyethylmethacrylate.

18. The projection television of claim 3 wherein the siloxane polymer having methyl and hydrophilic side groups is formed by reacting a siloxane polymer having methyl side groups with a hydrophilic reactant.

19. The projection television of claim 18 wherein the hydrophilic reactant is a polymer.

20. The projection television of claim 3 wherein the coupling fluid comprises a thermal stabilizer.

21. The projection television of claim 3 wherein the coupling fluid has an index of refraction greater than 1.50 at room temperature.

22. The projection television of claim 3 wherein the coupling fluid has an index of refraction greater than 1.52 at room temperature.

23. The projection television of claim 3 wherein the coupling fluid has an index of refraction greater than 1.53 at room temperature.

24. The projection television of claim 3 wherein the coupling fluid has a viscosity less than 10,000 centipoise at room temperature.

25. A projection television comprising a cathode ray tube and a projection lens wherein the projection lens is liquid coupled to the cathode ray tube by a coupling fluid comprising a siloxane polymer having methyl, phenyl, and hydrophilic side groups.

26. The projection television of claim 25 wherein the siloxane polymer has a degree of polymerization between 10 and 1,000.

27. The projection television of claim 25 wherein the siloxane polymer has a degree of polymerization between 50 and 500.

28. The projection television of claim 25 wherein the siloxane polymer has a degree of polymerization between 100 and 200.

29. The projection television of claim 25 wherein the siloxane polymer has a ratio of methyl side groups to phenyl side groups of between 3:1 and 1:3.

30. The projection television of claim 25 wherein the hydrophilic side groups comprise between 0.05 and 20 percent by weight of the coupling fluid.

31. The projection television of claim 25 wherein the hydrophilic side groups comprise between 0.05 and 2 percent by weight of the coupling fluid.

32. The projection television of claim 25 wherein the hydrophilic side groups comprise between 0.05 and 1 percent by weight of the coupling fluid.

33. The projection television of claim 25 wherein the hydrophilic side groups comprise polyethylene glycol.

34. The projection television of claim 25 wherein the hydrophilic side groups are selected from the group consisting of ethylene glycol, propylene glycol, and polypropylene glycol.

35. The projection television of claim 25 wherein the hydrophilic side groups are selected from the group consisting of polyvinyl alcohol, polyvinyl acetate, polyhydroxyethylacrylate, and polyhydroxyethylmethacrylate.

36. The projection television of claim 25 wherein the coupling fluid comprises a thermal stabilizer.

37. The projection television of claim 25 wherein the coupling fluid has an index of refraction greater than 1.50 at room temperature.

38. The projection television of claim 25 wherein the coupling fluid has an index of refraction greater than 1.52 at room temperature.

39. The projection television of claim 25 wherein the coupling fluid has an index of refraction greater than 1.53 at room temperature.

40. The projection television of claim 25 wherein the coupling fluid has a viscosity less than 10,000 centipoise at room temperature.

41. An article of manufacture comprising a cathode ray tube and a lens element wherein the lens element is liquid coupled to the cathode ray tube by a coupling fluid comprising a mixture of:
  (a) a siloxane polymer having methyl and phenyl side groups; and
  (b) a siloxane polymer having methyl and hydrophilic side groups.

42. An article of manufacture comprising a cathode ray tube and a lens element wherein the lens element is liquid coupled to the cathode ray tube by a coupling fluid comprising a siloxane polymer having methyl, phenyl, and hydrophilic side groups.

* * * * *